United States Patent
Bulpin

(10) Patent No.: US 11,385,910 B2
(45) Date of Patent: Jul. 12, 2022

(54) STACK-BASED COMMUNICATIONS SYSTEMS AND METHODS

(71) Applicant: Citrix Systems, Inc., Ft. Lauderdale, FL (US)

(72) Inventor: James Roy Bulpin, Cambridge (GB)

(73) Assignee: Citrix Systems, Inc., Ft. Lauderdale, FL (US)

( * ) Notice: Subject to any disclaimer, the term of this patent is extended or adjusted under 35 U.S.C. 154(b) by 39 days.

(21) Appl. No.: 16/407,571

(22) Filed: May 9, 2019

(65) Prior Publication Data

US 2020/0264906 A1    Aug. 20, 2020

Related U.S. Application Data

(60) Provisional application No. 62/806,328, filed on Feb. 15, 2019.

(51) Int. Cl.
*G06F 9/451* (2018.01)
*G06N 3/00* (2006.01)
*G06F 9/54* (2006.01)

(52) U.S. Cl.
CPC ............. *G06F 9/451* (2018.02); *G06F 9/546* (2013.01); *G06N 3/004* (2013.01)

(58) Field of Classification Search
None
See application file for complete search history.

(56) References Cited

U.S. PATENT DOCUMENTS

| | | | |
|---|---|---|---|
| 2005/0108439 A1 | 5/2005 | Need | |
| 2008/0005053 A1* | 1/2008 | Pulsipher | G06Q 10/10 706/45 |
| 2014/0156796 A1* | 6/2014 | Hong | G06F 16/24575 709/217 |
| 2014/0220954 A1* | 8/2014 | Lee | H04M 1/72403 455/418 |
| 2014/0280292 A1* | 9/2014 | Skinder | G06F 16/24534 707/767 |
| 2018/0365026 A1 | 12/2018 | Jernigan et al. | |
| 2019/0068527 A1* | 2/2019 | Chen | H04L 51/16 |

(Continued)

OTHER PUBLICATIONS

"Create a Bot For Your Workspace", retrieved online at https://get.slack/help/hc/en-us/articles/115005265703-Create-a-bot-for-your-workspace; retrieved online on May 9, 2019, 5 pages.

(Continued)

*Primary Examiner* — Charles E Anya
(74) *Attorney, Agent, or Firm* — Finch & Maloney PLLC

(57) ABSTRACT

A stack-based conversation engine is provided. The conversation engine enables a voice or text based virtual assistant to create interactive, conversational experiences in an extensible manner. The conversation engine can be used to support a conversation between a user and a virtual assistant. The conversation engine can be configured to receive, from the virtual assistant, a fulfillment request specifying an intent from the virtual assistant; push an item onto a conversation stack stored, the item including an identifier of the intent; execute an action handler associated with the intent to generate instructions to manipulate the conversation stack; manipulate the conversation stack according to the instructions; and store the conversation stack for subsequent processing in support of the conversation.

23 Claims, 10 Drawing Sheets

(56) References Cited

U.S. PATENT DOCUMENTS

| | | | | |
|---|---|---|---|---|
| 2019/0103112 A1* | 4/2019 | Walker | ................... | G10L 13/02 |
| 2019/0205386 A1* | 7/2019 | Kumar | ................... | G06N 5/02 |
| 2019/0324779 A1* | 10/2019 | Martin | ................... | G06F 40/30 |
| 2020/0125919 A1* | 4/2020 | Liu | ....................... | G06N 20/00 |

OTHER PUBLICATIONS

"Design and Control Conversation Flow", retrieved online at https://docs.microsoft.com/en-US/azure/bot-service/bot-service-design-conversion-flow?vi . . . , Dec. 18, 2018, retrieved online on May 9, 2019, 5 pages.

"Build Natural and Rich Conversational Experiences", retrieved online at https://dialogflow.com/, retrieved online on May 9, 2019, 7 pages.

PCT Invitation to Pay Additional Fees for Application No. PCT/US2020/018138 dtd May 8, 2020, 30 pages.

\* cited by examiner

STACK-BASED COMMUNICATIONS SYSTEMS AND METHODS

RELATED APPLICATIONS

This application claims priority under 35 U.S.C. § 119(e) to U.S. Provisional Application Ser. No. 62/806,328, titled "Systems and Methods for Stack-Based Data Communications," filed Feb. 15, 2019, which is hereby incorporated herein by reference in its entirety.

BACKGROUND

Virtual assistants, such as Google Assistant and Amazon Alexa, are software agents that interact with a user to perform tasks or services on behalf of the user. In accomplishment of such tasks or services, virtual assistants interpret and respond to human speech or text commands to answer questions, control devices, playback media, and manage other devices to perform basic tasks. To this end, virtual assistants are programmed using frameworks based on transactional models. The models allow virtual assistants to receive user inputs and generate outputs to facilitate an exchange of information between virtual assistants and the user to accomplish a desired task or service.

SUMMARY

In at least one example, a computer system is provided. The computer system is configured to support a conversation between a user and a virtual assistant. The computer system includes a memory and at least one processor coupled to the memory. The at least one processor is configured to receive, from the virtual assistant, a fulfillment request specifying an intent requesting information and/or execution of an action from the virtual assistant; push an item onto a conversation stack stored in the memory, the item including an identifier of the intent; execute an action handler associated with the intent to generate one or more instructions to manipulate the conversation stack; manipulate the conversation stack in accordance with the one or more instructions; and store the conversation stack in the memory for subsequent processing within the conversation.

At least some examples of the computer system can include one or more of the following features. In the computer system, the intent can be a first intent, the item is can be a first item, and to manipulate the conversation stack can include to push a second item onto the conversation stack, the second item including an identifier of a second intent. The at least one processor can be further configured to peek at the second item in the conversation stack to generate a response to the user regarding the second intent and transmit a fulfillment response to the virtual assistant, the fulfillment response comprising the response to the user.

In the computer system, the action handler can be a first action handler and to peek can include to execute a second action handler associated with the second item. In the computer system, the fulfillment request can include a full representation of the conversation stack. The fulfillment request can include a session identifier. The least one processor can be further configured to store, in the memory, an association between the conversation stack and the session identifier.

In the computer system, wherein the intent can be a first intent, the fulfillment request can be a first fulfillment request, and the at least one processor is further configured to receive a second fulfillment request comprising a second intent; call the action handler with the second intent to determine whether the action handler can process the second intent; and process a response message from the action handler. The response message can specify a response to the user and at least one instruction to manipulate the conversation stack. The at least one processor can be further configured to append the response to the user to another response to the user and manipulate the conversation stack in accordance with the at least one instruction. The response message can specify no additional action and the at least one processor can be further configured to take no additional action regarding the response message.

In the computer system, the item can be a first item and the at least one processor can be further configured to call the action handler to indicate that a second item will be placed atop the item prior to pushing the second item onto the conversation stack. In the computer system, to execute the action handler can include to generate a response to the user and the at least one processor can be further configured to transmit a fulfillment response to the virtual assistant, the fulfillment response comprising the response to the user. In the computer system, to execute the action handler can include to execute a programmatic action requested by a user.

In at least one example, a method of supporting a conversation between a virtual assistant and a user is provided. the method includes acts of receiving, from the virtual assistant, a fulfillment request specifying a intent; pushing an item onto a conversation stack stored in memory, the item including an identifier of the intent; executing an action handler associated with the intent to generate a response message including a response to the user and one or more instructions to manipulate the conversation stack; manipulating the conversation stack in accordance with the one or more instructions; storing the conversation stack in the memory for subsequent processing within the conversation; and transmitting a fulfillment response to the virtual assistant to continue the conversation, the fulfillment response comprising the response to the user.

At least some examples of the method can include one or more of the following features. In the method, the intent can be a first intent, the item can be a first item, and manipulating the conversation stack can include an act of pushing a second item onto the conversation stack, the second item including an identifier of a second intent. The method can further include acts of peeking at the second item in the conversation stack to generate an additional response to the user regarding the second intent; and appending the additional response to the user to the response to the user.

In the method, the action handler can be a first action handler and the act of peeking can include an act of executing a second action handler associated with the second item. In the method, the intent can be a first intent, the fulfillment request can be a first fulfillment request, and the method can further include acts of receiving a second fulfillment request comprising a second intent; calling the action handler with the second intent to determine whether the action handler can process the second intent; and processing another response message from the action handler. In the method, the item can be a first item and the method can further include an act of calling the action handler to indicate that a second item will be placed atop the first item prior to pushing the second item onto the conversation stack.

In at least one example, a non-transitory computer readable medium is provided. the computer readable medium stores executable sequences of instructions to implement a conversation stack supporting a conversation between a user and a virtual assistant. The sequences of instructions include instructions to receive, from a virtual assistant, a fulfillment request specifying a intent; push an item onto a conversation stack stored in a memory, the item including an identifier of the intent; execute an action handler associated with the intent to generate one or more instructions to manipulate the conversation stack; manipulate the conversation stack in accordance with the one or more instructions; store the conversation stack in the memory for subsequent processing within the conversation; and transmit a fulfillment response to the virtual assistant.

At least some examples of the computer readable medium can include one or more of the following features. In the computer readable medium, the intent can a first intent, the item can a first item, and the instructions to manipulate the conversation stack can include instructions to push a second item onto the conversation stack, the second item including an identifier of a second intent. The sequences of instructions can further include instructions to peek at the second item in the conversation stack to generate a response to the user regarding the second intent; and store the response to the user in the fulfillment response. In the computer readable medium, the action handler can be a first action handler, and the instructions to peek can include instructions to execute a second action handler associated with the second item.

In at least one example, a system is provided. The system includes at least one virtual assistant device and a computing device in communication with the at least one virtual assistant device via a network. The computing device includes a processor and a memory accessible by the processor. The processor is configured to receive information about an intent of a user for a communication received at the at least one virtual assistant device, the intent being identifiable based on a set of skills of the at least one virtual assistant device; provide at least one item of data in a data structure of the memory, the at least one item of data representative of one context of a plurality of contexts for a given conversation between a user and the at least one virtual assistant device, and the data structure being constructed and arranged as a stack of items of data; modify the data structure based on the received information, the modification of the data structure including at least one of a change in a number or position of items in the stack of items of data based on the intent of the user; and provide a response to the user using the modified data structure, the response directed to one context of the plurality of contexts of the conversation based on one item of the data structure to prevent transmission of the response with an incorrect context.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
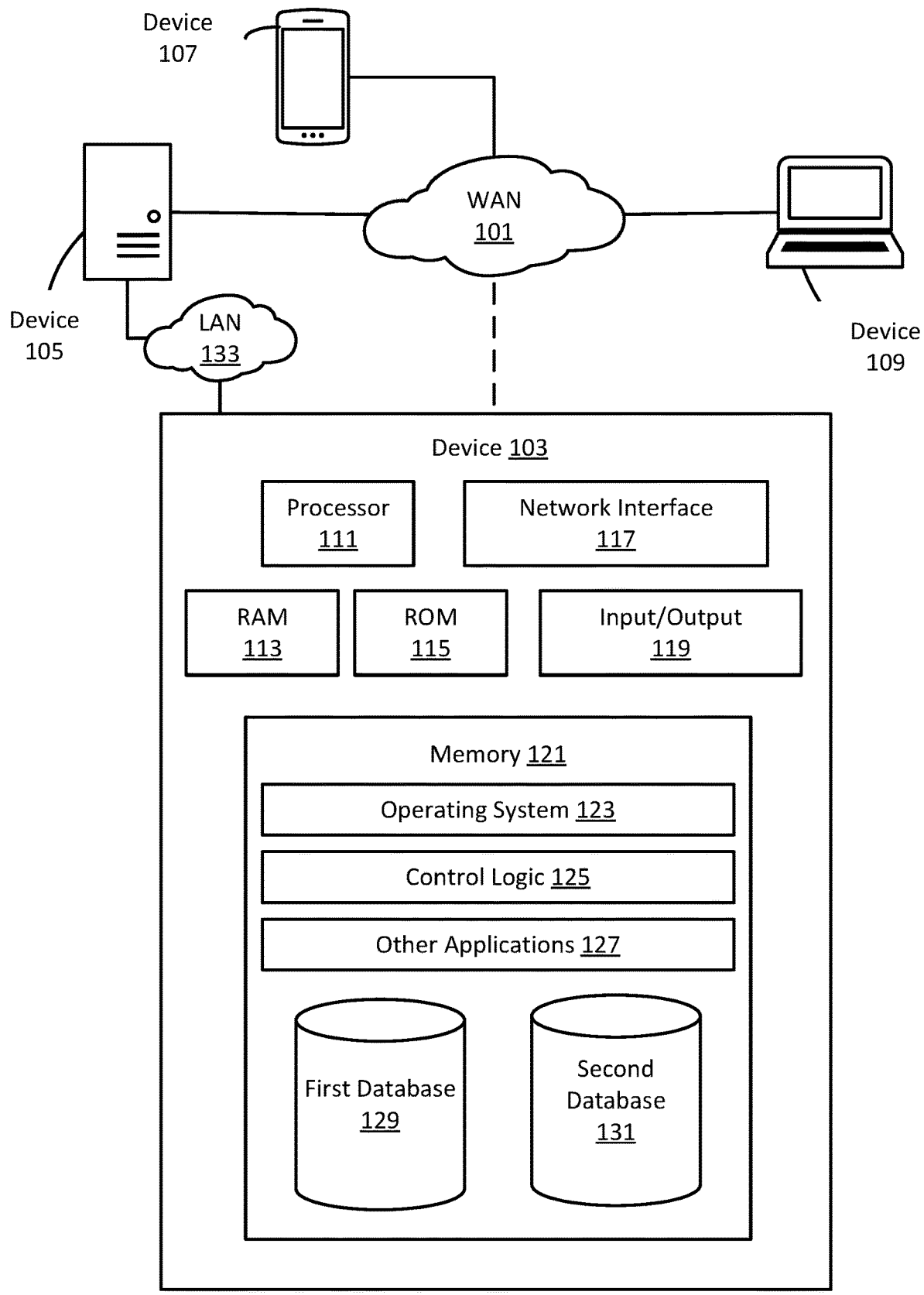
FIG. 1 is a block diagram depicting an architecture of a computer system in accordance with one or more examples described herein.

As summarized above, various examples described herein are directed to systems and methods that implement a stack-based conversation engine to enable a voice or text based virtual assistant to create interactive, conversational experiences in an extensible manner. These systems and methods overcome practical limitations present in other virtual assistance technologies. Virtual assistants that can interoperate with the systems and methods described herein include the Alexa virtual assistant available from Amazon.com, Inc. of Seattle, Wash., the Google Assistant virtual assistant available from Google Inc. of Mountain View, Calif., and SLACKBOT® bots available from Slack Technologies, Inc. of San Francisco, Calif.

For instance, some frameworks, and the software development kits they provide, are based on transactional models in which a user asks a question and gets a response or requests an action that the virtual assistant, in turn, executes (e.g., via interoperation with external systems). Plying these transactional frameworks to a naturally flowing, complex, and layered human conversation is technically difficult as the developer is required to manage state (e.g., the current location within a conversation) and context of the conversation within a system designed for human-machine interactions that are isolated from one another. Code developed within this environment can be fragile, inflexible, and difficult to extend.

More specifically, to communicate with users naturally, virtual assistants are sometimes programmed to participate in conversations that span multiple intents. Each of these intents can be a distinct request for information or action uttered or typed by a user that a skill or other conversation agent accessible by the virtual assistant can successfully process. For instance, where a user asks, "what is my schedule?", a skill designed to process this question as an intent may require a period of time (e.g., today, this week, etc.) to search for scheduled events and respond to the user. Some virtual assistance frameworks store such contextual data within context variables. Additionally, some virtual assistance frameworks include Boolean flags within context variables that can influence processing of multiple intents.

Context variables and intents are set and cleared during the course of a conversation. However, due to the transactional nature of at least some virtual assistance frameworks and the scope of influence of context variables, skill developers must carefully manage context variables to prevent leakage across intents. Examples of such leakage can include a situation in which a value assigned to context variable within code configured to process a first intent is not properly reassigned (by the developer) in code configured to process a second intent. Leakage can result in incorrect dialog, among other issues. Thus, when working with virtual assistance frameworks, developers need additional strategies to address management of context variables and intents, including strategies that involve removal of unwanted context variables in various portions of code. For at least these reasons, construction and development of virtual assistants can be time consuming and costly because additional (or ongoing) efforts are needed to ensure proper operation of the virtual assistant to avoid generation of incorrect responses to expressed user intents. Such errors can impair the user experience and/or all together inhibit operation of the virtual assistant.

To overcome the above limitations, and to overcome other limitations that will be apparent upon reading and understanding the present specification, some examples described herein are directed towards computing devices, systems, and methods that build upon the basic building blocks of context variables to provide a higher level of abstraction of the current state of a conversation. These computing devices can be used in conjunction with virtual assistants or otherwise be integrated therein. In particular, some examples described herein provide computing devices and methods that compose or otherwise integrate multiple individual voice interactions into a conversation. These examples can represent conversation states of the device within a stack in accordance with the outcomes of individual handlers for each spoken intent. These conversation states can reflect a current location of the participants within a conversation including any number of intents. The stack structure allows the context of a conversation to be implicit and thereby avoids complex and error-prone management of context variables. In addition, the stack structure enables arbitrary composition of different intents into a conversation that flows naturally. Thus, the computing devices, systems, and processes of the present disclosure provide improvements in both flexibility and usability of virtual assistants.

For instance, at least some solutions structure conversations in a stack-like manner (e.g., a request to perform a particular action may lead to clarifying questions, or additional dialog that precedes completion of the originally requested action). In one such example, a conversation may include a request to "dial into the meeting." In response, the computing device may be configured to ask the user if they wish to open a recommended document (assuming a productivity analytics service is making such recommendations) before joining the meeting. This second part of the dialog is, in effect, pushed on to the conversation stack on top of the original request. Once the computing device addresses or otherwise competes the second (or new) part of the dialog, it returns to the first (or previous) part of the conversation related to joining the meeting. Thus, the context of both the previous and new portions of the dialog are maintained and properly addressed.

At least some of the examples disclosure herein promote loose coupling between skills which enables design and construction of each skill (and future new skills) to be done in relative isolation without having to worry about how the skills will interact with existing or future skills that may be used in the same conversation. For instance, the devices, systems, and methods described herein permit creation of flowing conversations in a manner that is flexible, easy to build and extend, and avoids creation of hard-coded interactions between different parts of dialogs. These and additional aspects will be appreciated with the benefit of the disclosures discussed in further detail below.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more examples described herein in a standalone and/or networked environment. Various network nodes or devices 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components illustrated in FIG. 1 may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary. For example, services provided by web server 105 and data server 103 may be combined on a single server.

Each device 103, 105, 107, and 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, playback, and/or printing data or files. In addition, the I/O devices 119 may include microphones and speakers to playback or other transmit data in an audible format. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some examples, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more examples may be embodied in computer-usable or readable data and/or computer-executable instructions, such as in one or more programs or program modules, executed by one or more computers or other devices as described herein. Generally, programs and program modules include routines or code, objects, components, data structures, etc. that perform particular tasks or implement particular data types when executed by a processor in a computer or other device. The modules may be written in a source code programming language that is subsequently compiled for execution or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
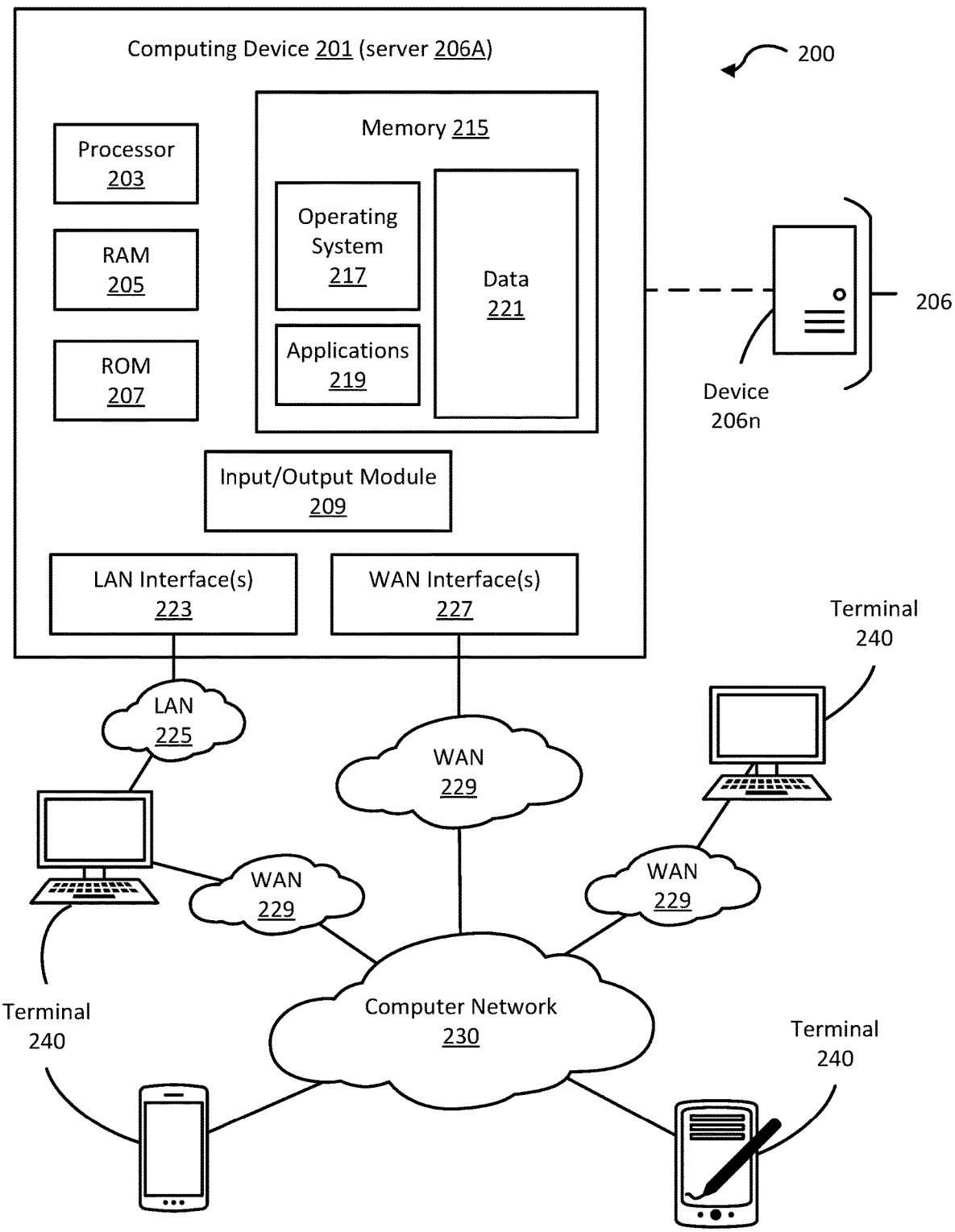
FIG. 2 a block diagram depicting an architecture of a remote-access system in accordance with one or more examples described herein.

With further reference to FIG. 2, one or more aspects described herein may be implemented in a remote-access environment. FIG. 2 depicts an example system architecture including a computing device 201 in an illustrative computing environment 200 that may be used according to one or more examples described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229 but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, smart speakers, virtual assistants, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, virtual assistants, smart speakers, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one example, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some examples be referred to as a single client machine 240 or a single group of client machines 240, while server(s) 206 may be referred to as a single server 206 or a single group of servers 206. In one example a single client machine 240 communicates with more than one server 206, while in another example a single server 206 communicates with more than one client machine 240. In yet another example, a single client machine 240 communicates with a single server 206.

A client machine 240 can, in some examples, be referenced by any one of the following non-exhaustive terms: client machine(s); client(s); client computer(s); client device(s); client computing device(s); local machine; remote machine; client node(s); endpoint(s); or endpoint node(s). The server 206, in some examples, may be referenced by any one of the following non-exhaustive terms: server(s), local machine; remote machine; server farm(s), or host computing device(s).

Some examples include a client device 240 that provide application output visually, audibly (or both) generated by an application remotely executing on a server 206 or other remotely located machine. In these examples, the client device 240 may execute a virtual machine receiver program or application to provide the output via a smart speaker, virtual assistant, or other computing device. The output can be provided in text or audible formats.

The server 206, in some examples, uses a remote presentation protocol or other program to send data to a thin-client or remote-display application executing on the client to present provide output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some examples, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some examples the server farm 206 may be administered as a single entity, while in other examples the server farm 206 can include multiple server farms.

In some examples, a server farm may include servers 206 that execute a substantially similar type of operating system platform (e.g., WINDOWS, UNIX, LINUX, iOS, ANDROID, SYMBIAN, etc.) In other examples, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some examples include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface and communicate directly with the client 240 to provide the client 240 with access to an identified application. One or more clients 240 and/or one or more servers 206 may transmit data over network 230, e.g., network 101.

Figure 3:
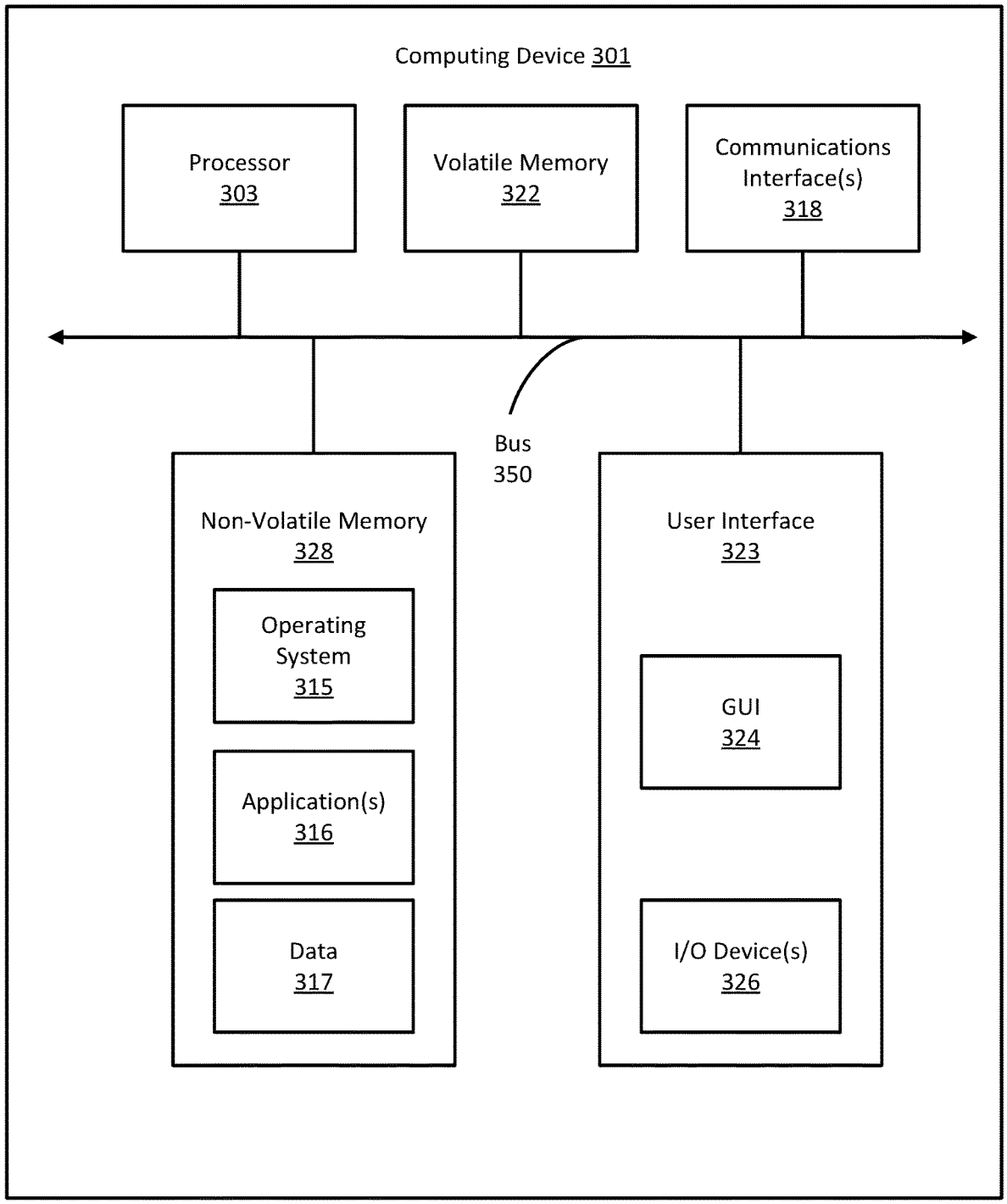
FIG. 3 is a block diagram illustrating a computing device in accordance with one or more examples described herein.

FIG. 3 is a block diagram of examples of a computing device. As shown in FIG. 3, computer 301 may include one or more processors 303, volatile memory 322 (e.g., RAM), non-volatile memory 328 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 323, one or more communications interfaces 318, and communication bus 350. User interface 323 may include graphical user interface (GUI) 324 (e.g., a touchscreen, a display, etc.) and one or more input/output (I/O) devices 326 (e.g., a mouse, a keyboard, speaker, microphone etc.). Non-volatile memory 328 stores operating system 315, one or more applications 316, and data 317 such that, for example, computer instructions of operating system 315 and/or applications 316 are executed by processor(s) 303 out of volatile memory 322. Data may be entered using an input device of GUI 324 or received from I/O device(s) 326. Various elements of computer 301 may communicate via communication bus 350. Computer 301 as shown in FIG. 3 is shown merely as an example, as clients 103, 105, 107, 109, 201 and servers 206 may be implemented by any computing or processing environment and with any type of machine or set of machines that may have suitable hardware and/or software capable of operating as described herein.

Processor(s) 303 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some examples, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some examples, the "processor" may be one or more physical processors or one or more "virtual" (e.g., remotely located or "cloud") processors.

Communications interfaces 318 may include one or more interfaces to enable computer 101 to access a computer network such as a LAN, a WAN, or the Internet through a variety of wired and/or wireless or cellular connections.

In described examples, the computing device 301 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Example Conversation Stack Systems and Devices

In some examples, the systems and methods described herein are configured to implement a conversation stack architecture that includes a stack to organize user-initiated intents into an implicit context for a conversation. In these examples, the position of an intent within the stack relative to other intents indicates the intent's position and recency within a conversation. The use of a stack data structure provides an elegant solution to the problem of explicit maintenance of context variables currently suffered by developers of skills. Moreover, use of the stack enables each skill to operate using information that is local to the skill as defined by its position within the stack. These attributes promote the development of loosely coupled skills that are robust with respect to the presence of multiple intents within a conversation.

In some examples, the stack is encapsulated within a stack engine that is configured to maintain the stack and to expose an interface to allow other processes to manipulate the stack. In these examples, each new user-initiated intent (e.g. "dial into the meeting") causes one or more items to be pushed on to the stack. These items can include identifiers of intents and parameters associated with the intents. In turn, the stack engine is configured dispatch intents to action handlers for execution. These action handlers are configured to process the intents and can elect to push more items on to the stack either above or below the item storing the dispatched intent. In this way, the stack engine is configured to maintain a stack structure that is an implicit context for each conversation.

Figure 4:
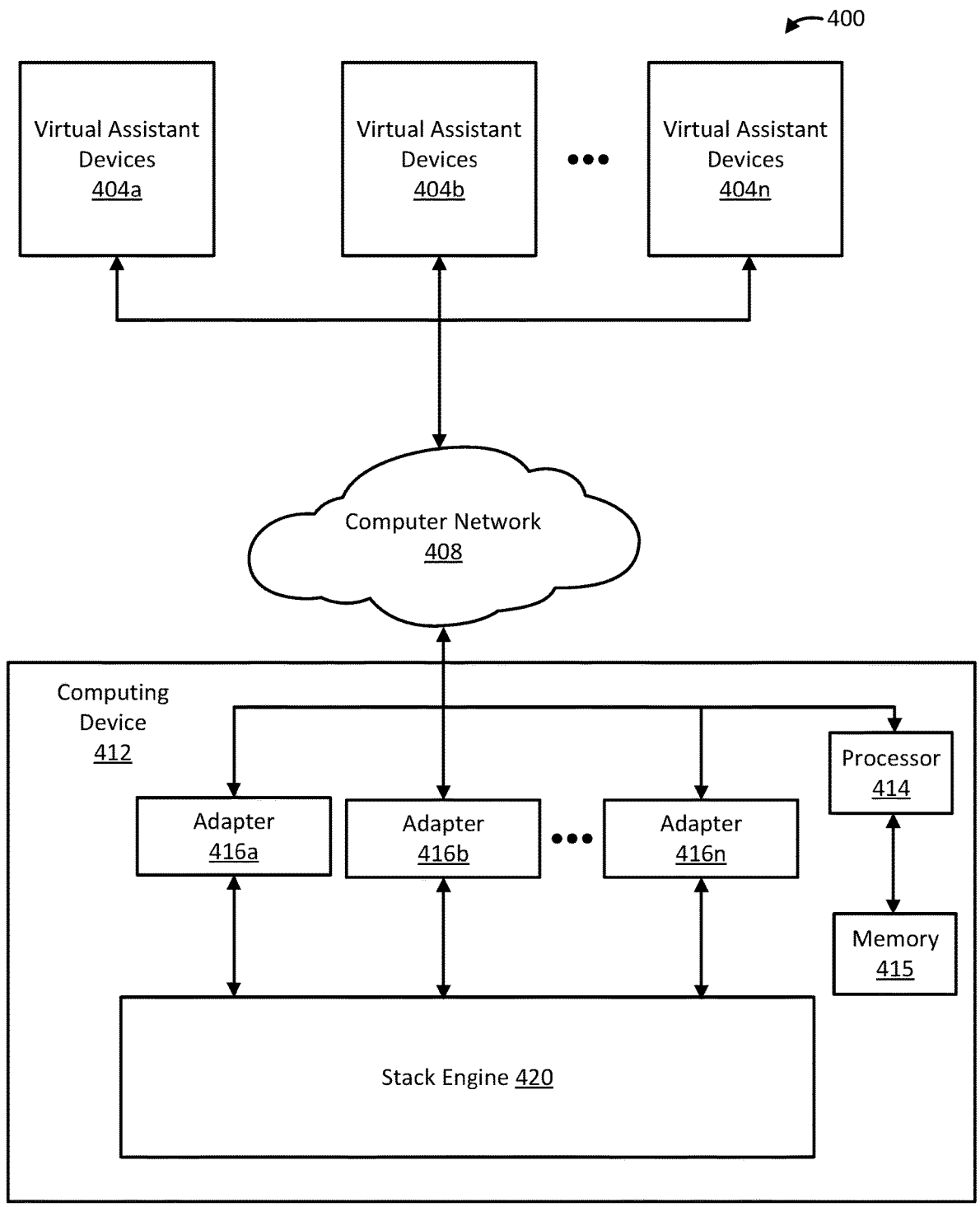
FIG. 4 is a block diagram illustrating an example of a computing system that incorporates a conversation stack architecture in accordance with one or more examples described herein.

FIG. 4 illustrates a computing system 400 that incorporates one example of a conversation stack architecture. In one example of the present disclosure, the system 400 may include a plurality of virtual assistant devices 404a, 404b, and 404n (collectively referred to as virtual assistant devices 404) in communication with a computing device 412 via a network 408. The network 408 can be a local or wide area network (e.g., the Internet or campus network).

Virtual assistant devices 404 can be any type of virtual assistant platform. Associated with each device 404 are skills that enable the device 404 to interact or otherwise interface with the user. Service/device-specific skills define phrases that a user may utter to interact with the virtual assistant. The virtual assistant devices 404 may be associated with one or more skills that are, in turn, associated with a user intent defined with a number of example phrases. For instance, in one example, the "ScheduleQuery" intent is defined to allow a user to ask the device 404 what is next on her schedule. In some examples, this is defined as an intent with name "ScheduleQuery" with simple utterances of "what's on my schedule", "what's next on my calendar", and so on. The intent uses fulfillment to provide a response to the user. This fulfillment process can include, for example, a skill infrastructure calling a provided webhook or some other application program interface (API) endpoint with information on the matched intent and the webhook returning details including the response that is to be provided to the user. Note that hard-coded textual responses cannot be defined within the skill itself.

The computing device 412 implements a stack architecture that is configured to receive and provide information (e.g., calls/requests and responses) to and from the virtual assistant devices 404. The computing device 412 can be any of the devices previously described herein, such as devices 103, 105, 107, 109, computing devices 201, servers 206, terminals 240, or computing device 301. The computing device includes one or more processors 414, a memory 415, adapters 416a, 416b, and 416n (collectively referred to as adapters 416) and the architecture. The processors 414 and memory 415 are similar to those previously described in relation to FIGS. 1-3.

The adapters 416 are configured to receive calls for skill fulfillment and map specific intent request and response formats and session management mechanisms/information to the architecture. As can be seen, the adapters 416 can be integrated within the computing device 412. In other examples, the adapters 416 can be integrated within another device and communicatively coupled to device 412 via the network 408. Because each virtual assistant can use different formats for its fulfillment of requests and responses and can manage conversation sessions differently (a session here being defined as, for example, a series of user inputs that form part of the same logical conversational exchange), the adapters 416 are configured to create an abstraction layer to map the fulfillment requests and responses to a generic format for use by the computing device 412. The adapters 416 are configured to ensure that the stack itself is retained between individual fulfillment calls that belong to the same conversation session. For instance, in some examples, the adapter 416a is configured to ensure retention of the stack by returning a full JSON representation of the stack as a session attribute in a fulfillment response. In these examples, a first skill and its supporting infrastructure are configured to store/maintain and send session attributes (in this case including the JSON representation of the stack) as part of a fulfillment request; therefore, in these examples the next fulfillment request in the same conversation includes the stack that was returned with the previous fulfillment response. Alternatively or additionally, in some examples, the adapter 416b is configured to store the stack in memory allocated to the adapter. In these examples, a second skill and its supporting infrastructure are configured to use a unique session identifier, which can be sent as part of the fulfillment request. In at least one example, the adapter 416b is configured to locate the correct stack for each subsequent fulfillment request via, for example a cross-reference that maps session identifiers to stack identifiers and/or addresses.

In some examples, the stack engine 420 is configured or otherwise programmed to receive intents and stacks from the adapters 416, manipulate data in the stack, route user input intents/replies to the relevant handlers, push and pop items to/from the stack, generate responses to the user, and provide user responses and new stacks to the adapters 416. Further description of one example implementation of the architecture is provided below with reference to FIG. 5.

Figure 5:
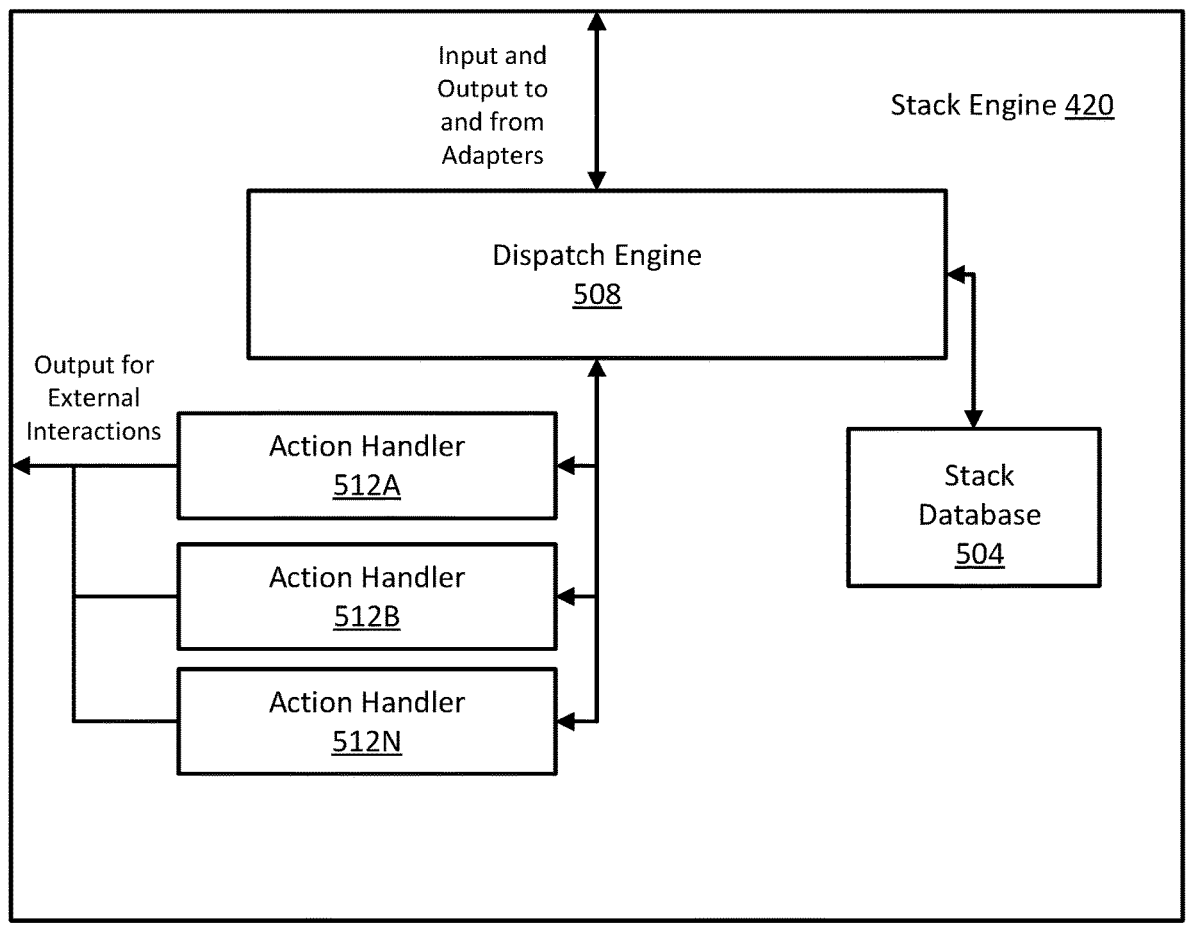
FIG. 5 is a block diagram illustrating one example a conversation stack architecture in accordance with one or more examples described herein.

FIG. 5 illustrates an example conversation stack architecture in accordance with one or more examples described herein. In general, the conversation stack architecture is configured to take or otherwise receive as input: (1) the current stack (or stack data set) for a conversation (which may be empty for a new conversation) and (2) an intent from the user and identified by the skill and passed to the adapter. The conversation stack architecture is configured to handle or otherwise process that intent in the context of that stack data set and output a modified stack data set, a response to the user, and optionally external side effects (such as performing some action). The conversation stack architecture is configured to provide text (or other data) as a response to the user via a network (e.g., the network 408 of FIG. 4) to virtual assistant devices (e.g., the virtual assistant devices 404).

In one example, the conversation stack architecture may include the stack engine 420. The engine 420 is configured to manipulate the stack data set and generate a response to send to the user. The stack engine 420 may include a stack database 504 (also known as the "stack"), a dispatch engine 508, and action handlers 512A, 512B and 512N (hereinafter referred collectively as action handlers 512).

In certain examples, the dispatch engine 508 is configured to receive input from an adapter (e.g. one of the adapters 416) and to transmit output to the adapter after the stack engine 420 has completed processing of the input. This input can include an intent and an representation of the stack. The output can include a user response and an representation of the stack in support of an ongoing conversation. In some examples, the dispatch engine 508 is configured to generate the output representation of the stack serializing and/or stringifing the stack to create a transmittable representation of the stack.

In some examples, the dispatch engine 508 is also configured to transmit API calls to action handlers to invoke their execution during processing of the input in accordance with the processes described further below with reference to FIGS. 6A-7. These API calls can include a "handleIntent" call, a "peek" call, and a "informNewIntentAbove" call, each of which is described further below. In some examples, the dispatch engine 508 is also configured to receive instructions and user responses from the action handlers 512 and to manipulate the stack database 504 based on the received instructions.

In some examples, the action handlers 512 are configured to receive and process determined intents to provide direction or instructions to manipulate the stack of items of data within the stack database 504. Action handlers 512 can be implemented or otherwise registered in a "plug-in" manner. In one example, the stack engine 420 is configured to dispatch a specific intent to the relevant, associated action handlers 512 registered to receive the intent. Each action handler 512 can specify which intent(s) it can handle. These intents can include a mandatory, primary intent (e.g. "ScheduleQuery" to continue to example started above), which can be descriptive of what this action handler does (e.g., the handler can perform schedule queries). Action handlers 512 can also register to receive other intents, such as generic user replies/intents such as "Yes", "No" and "Number" (these are defined in the skill in the same way as primary intents and may have optional variables/parameters associated with them, for example a user input of "two" may match intent "Number" and have variable/parameter "value" be set to 2). With the intents received, the action handlers 512 can process the intents to provide direction to the dispatch engine 508 to enable the stack engine 420 to generate a response to send to the user.

In some examples, each of the action handlers 512 is configured to expose an API through which the action handlers 512 receive and process API calls from the dispatch engine 508. The specific actions executed by a particular action handler 512 in response to these API calls will vary depending on the design goals of the action handler, but an action handler designed to fully leverage the advantages of the conversation stack architecture implement each of the API calls.

For instance, in one example, an action handler 512 can be configured to receive a "handleIntent" call that specifies a particular intent to be processed by the action handler. To process the handleIntent call, the action handler is configured to execute one or more programmatic actions with external services (e.g., transmit a request message to a schedule service, an active directory service, a purchasing service, etc.) based on the intent and to prepare a user response to the intent and any results generated by previously executed actions. To process the handleIntent call, the action handler can be further configured to prepare instructions to manipulate the stack based on the intent and return a response to the call that includes the user response and/or the instructions. In another example, the action handler 512 can be configured to receive a "peek" call that indicates a stack item associated with the handler is now positioned at the top of the stack. To process the peek call, the action handler can be configured to execute one or more programmatic actions with external services, prepare a user response, and return a response to the call that includes the user response. In another example, the action handlers 512 can be configured to receive an "informNewIntentAbove" call specifying an intent to be pushed atop the stack within a stack item above the stack item associated with the action handler. To process the informNewIntentAbove call, the action handler can be configured to execute one or more programmatic actions with external services, prepare a user response, prepare instructions to manipulate the stack, and return a response to the call that includes the user response.

In certain examples, the stack database 504 is composed of items of data containing a primary intent (which is, in effect, a focus of a conversation) and optionally parameters (as described further below). For instance, in one scheduling-related example, the stack can hold three items. The first item can include an intent field that stores a value of "ScheduleQuery" and a parameters field that stores a value of (none) or NULL. The second item can include an intent field that stores a value of "JoinAConferenceCall" and a parameters field that stores a set of values such as {"tel": "1800 555-4567","pin":4936}. The third item can include an intent field that stores a value of "AnythingElseYouNeed" and a parameters field that stores a value of (none) or NULL. In this example, the implicit structure of a conversation organized by the stack specifies resolution of the ScheduleQuery intent first, the JoinAConferenceCall intent second, and the AnythingElseYouNeed intent third, although this order of resolution can change based on subsequent interaction between the user and the conversation agent.

The components of the conversation stack architecture described above with reference to FIGS. 4 and 5 collectively provide a framework for development of conversation agents that are robust to involvement within conversations having multiple intents while providing for a natural flowing conversation with a user. Some examples of processes executed by the components described in FIGS. 4 and 5 are further described below with reference to FIGS. 6A-7.

Figure 8:
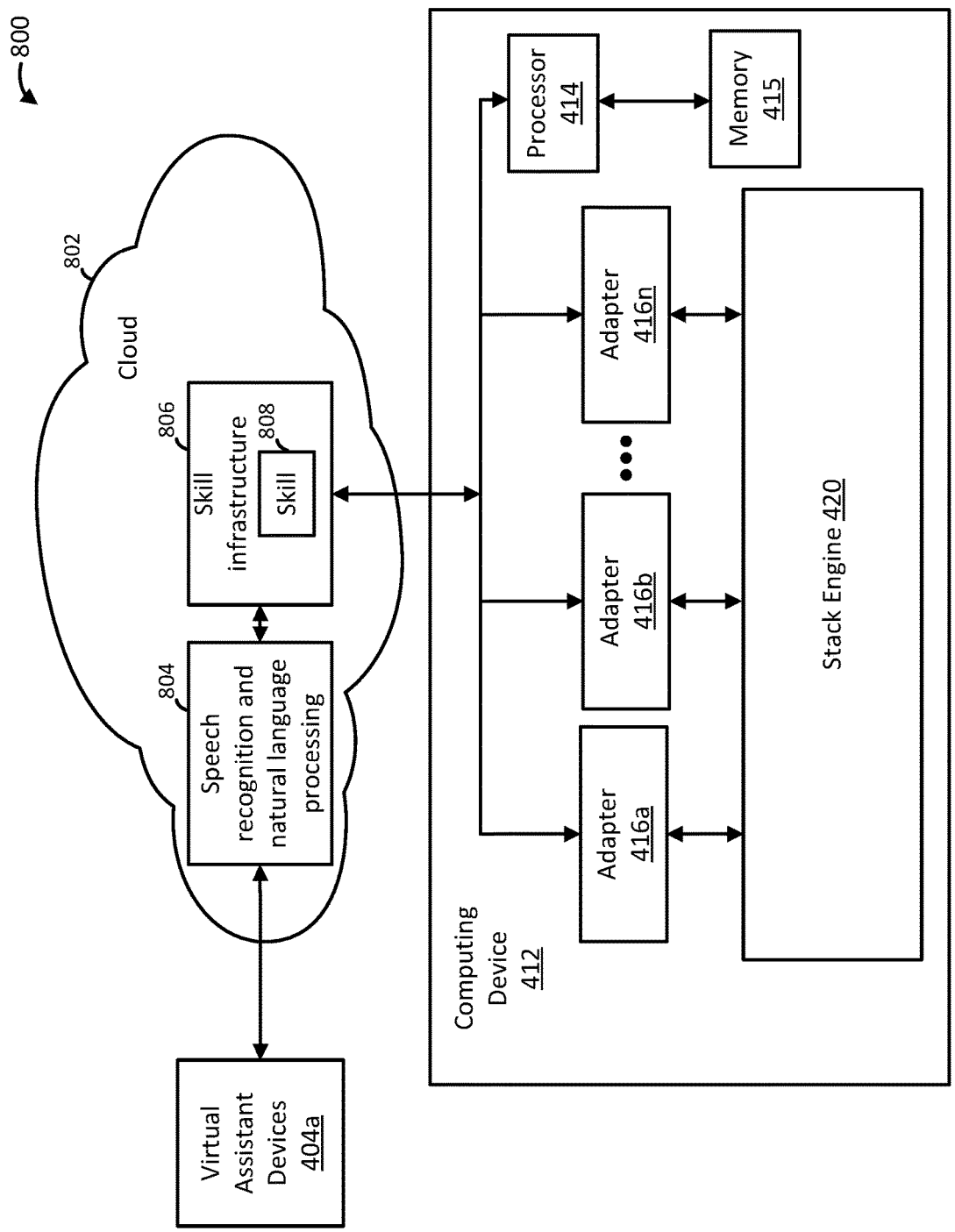
FIG. 8 is a block diagram illustrating an example a conversation stack architecture configured for operation within a distributed computing platform in accordance with one or more examples described herein.

FIG. 8 illustrates a conversation stack architecture (e.g., the conversation stack architecture of FIG. 4) configured for operation within a distributed computing platform (e.g. as described above with reference to FIGS. 1 and 2). As shown in FIG. 8, the configuration 800 includes the virtual assistant devices 404a and the computing device 412 of FIG. 4. The configuration 800 also includes a cloud computing infrastructure 802. The infrastructure 802 hosts speech recognition and natural language processing services 804 and a skill/conversation agent infrastructure 806. The infrastructure 806 hosts a skill/conversation agent 808. Within the configuration 800, the devices 404a, 412 and the cloud infrastructure 802 exchange (i.e., transmit and/or receive) data with one another via network interfaces.

Many of the components illustrated in FIG. 8 are described above with reference to FIG. 4. For purposes of brevity, those descriptions will not be repeated here, but each of the components of FIG. 4 included in FIG. 8 is configured to function in FIG. 8 as described in FIG. 4. However, the descriptions of any of these components may be augmented or refined below.

As illustrated in FIG. 8, the device 404a is configured to acquire verbal utterances from a user and transmit audio data representing the utterances to the speech processing service 804. The speech processing service 804 is configured to interoperate with the skill infrastructure 806 to identify a skill (e.g., the skill 808) and an intent expressed in the audio data. The skill infrastructure 806 is configured to receive the identified skill and the intent from the speech processing service 804, to identify an API endpoint associated with the skill 808 (e.g., stored within its configuration information), and to transmit a fulfillment request to the API endpoint. In this example, the API endpoint to which the fulfillment request is transmitted is exposed by the adapter 416a of the conversation stack architecture.

In some examples, the conversation stack architecture is configured to process the fulfillment request as described herein and transmits a fulfillment response to the skill 808 and its supporting infrastructure 806. The skill 808 and its supporting infrastructure 806 are configured to parse the fulfillment response, identify any user response included in the fulfillment response and transmit the identified user response to the speech service 804. The speech service 804, in turn, is configured to render the user response as audio data and transmit the audio data to the device 404a for provision to the user by the virtual assistant.

The configuration 800 is but one example of many potential configurations that can be used to implement a conversation stack architecture. For instance, in some examples, the adapters 416 are each hosted on a computing devices that are distinct from one another and from a computing device that hosts the stack engine 420. In these and other examples, the stack engine 420 can be a distinct cloud service that exposes an API to enable the adapters 416 to register themselves with the stack engine 420. Additionally or alternatively, when implemented as a cloud service, the stack engine 420 can expose an API to enable action handlers (e.g., the action handlers 512 of FIG. 5) to register themselves with the stack engine 420. As such, the examples disclosed herein are not limited to the particular configuration 800 and other configurations are considered to fall within the scope of this disclosure.

Example Conversation Stack Processes

Figure 6A:
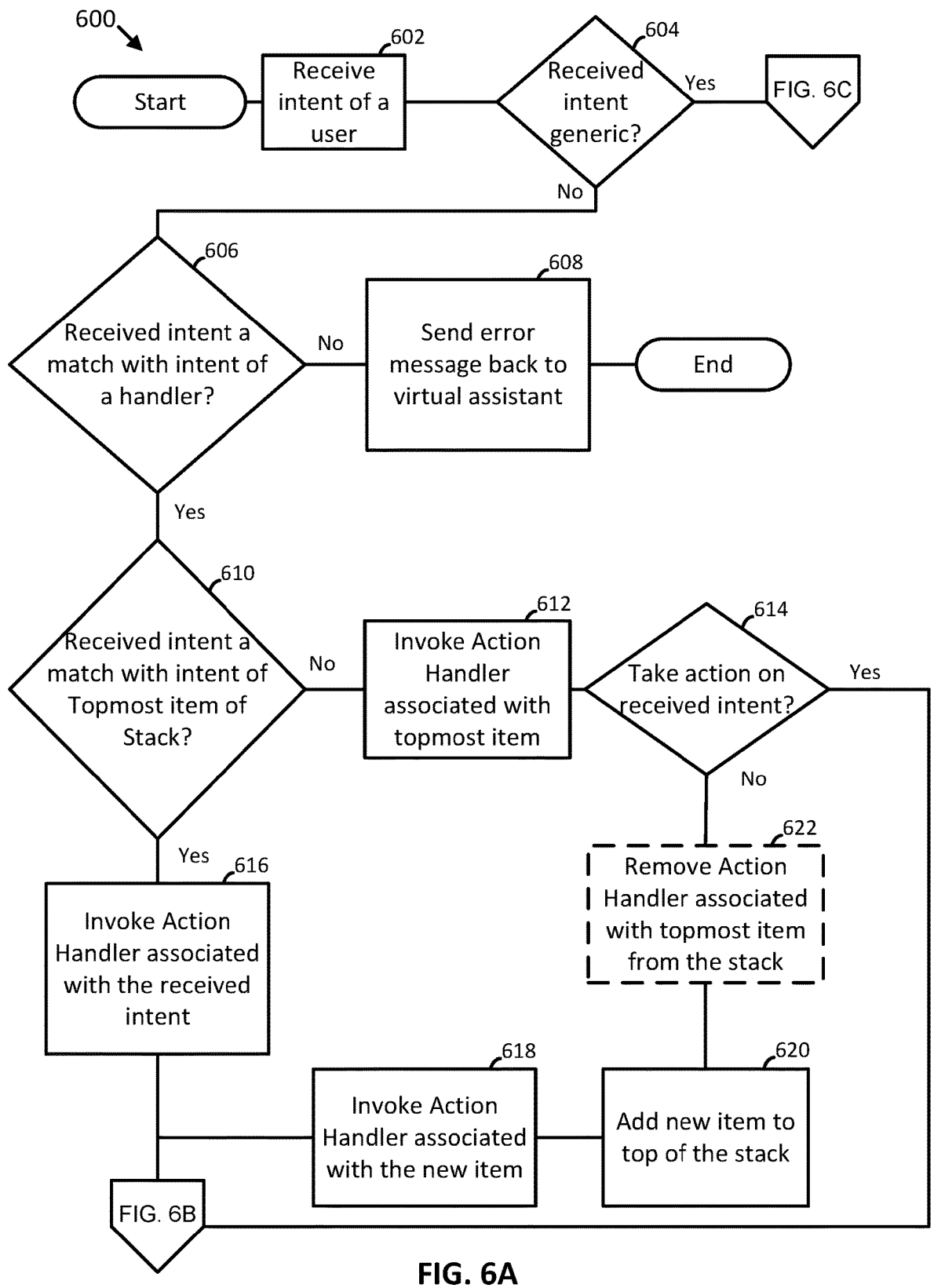
FIGS. 6A, 6B, and 6C are a flowchart of a method for providing responses to a user of a virtual assistant implemented by a distributed computer system including a conversation stack architecture in accordance with one or more examples described herein.
Figure 6B:
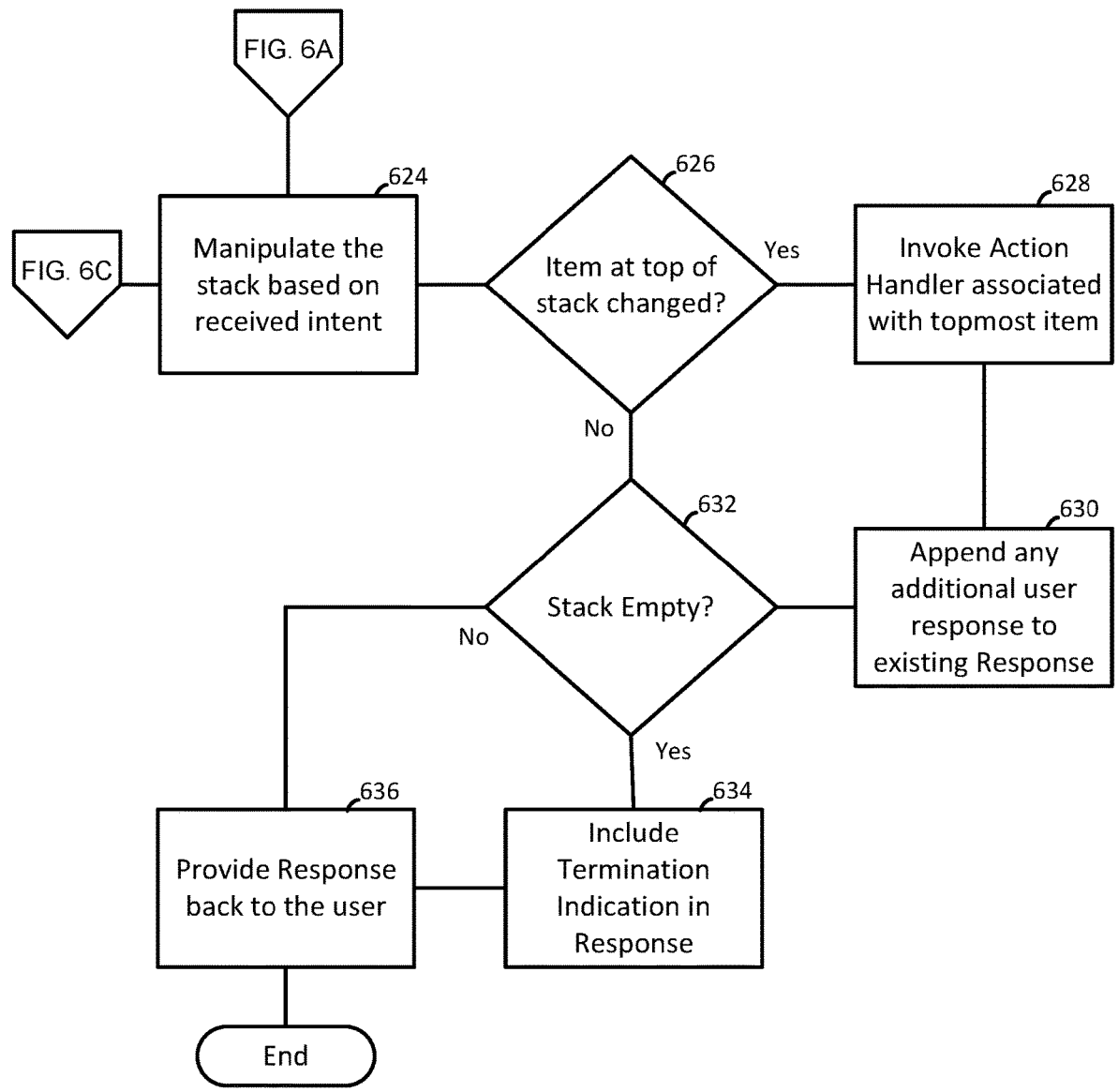
Figure 6C:
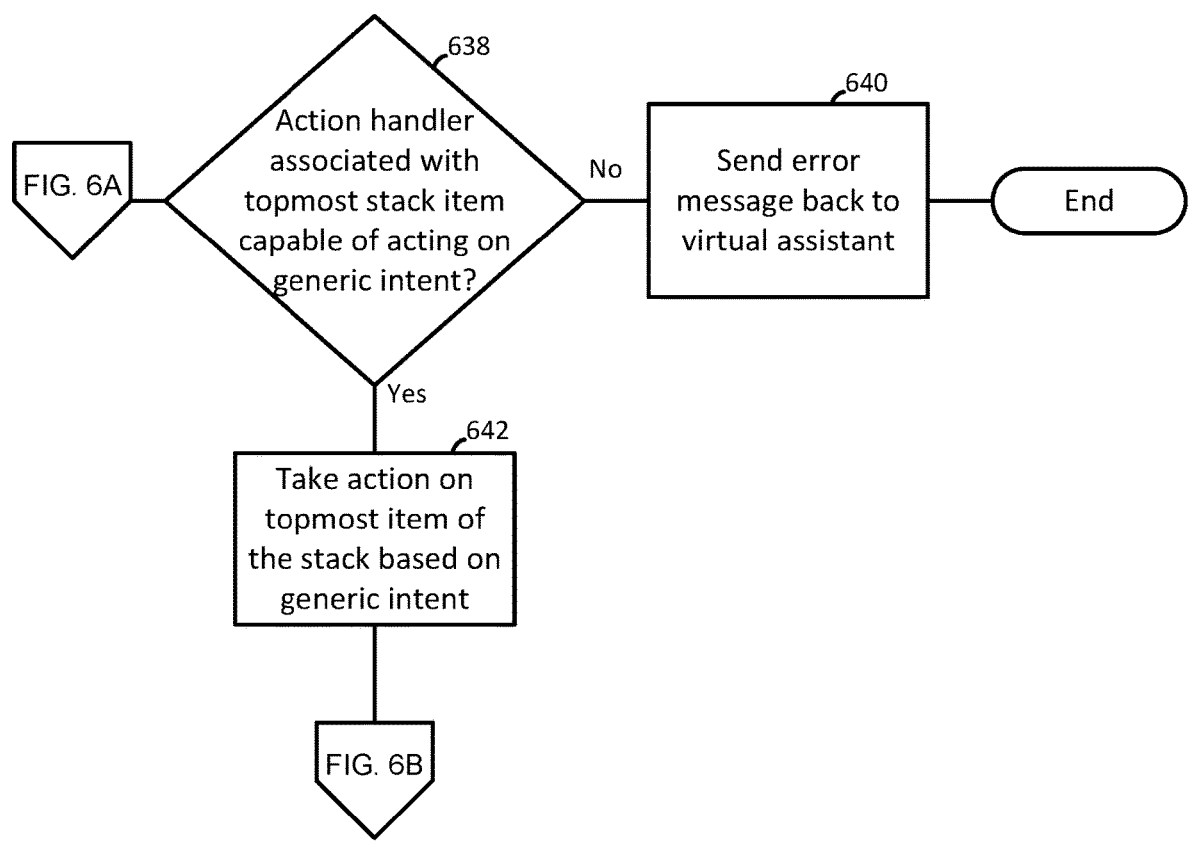

FIGS. 6A, 6B, and 6C are flowcharts of an example method/process 600 for providing responses to a user of a virtual assistant based on a conversation stack architecture. As shown in FIG. 6A, the process 600 starts with a conversation stack architecture (e.g., the stack engine 420 and the adapters 416 of FIG. 4) receiving 602 an intent from a skill or other conversation agent. The conversation stack architecture determines 604 whether the received intent is a generic user reply intent (e.g. "Yes" or "No"). If the conversation stack architecture determines 604 that the received intent is a generic intent, the conversation stack architecture proceeds to the subprocess illustrated in FIG. 6C. If the conversation stack architecture determines 604 that the received intent is not a generic intent, the conversation stack architecture (e.g., the stack engine 420) determines 606 whether the received intent matches a primary intent of a registered action handler (e.g., one of the action handlers 512 of FIG. 5). Where the conversation stack architecture determines that the received intent does not match a primary intent of a registered action handler, the conversation stack architecture sends/transmits 608 an error message within a fulfillment response to the conversation agent supporting the virtual assistant.

When the conversation stack architecture receives an intent that matches a primary intent for a registered action handler, a stack engine (e.g., the stack engine 420) checks a stack database (e.g., the stack database 504 of FIG. 5) to determine 610 whether the received intent matches the intent stored in the topmost item of a stack supporting the current conversation with the user. In some instances, if the topmost item of the stack includes the same primary intent, then the action handler for that intent is invoked 616 via, for example, a dispatch engine (e.g., the dispatch engine 508 of FIG. 5). Otherwise, if there is an existing intent at the top of stack (e.g., it's not an empty stack) then the registered action handler for that intent is invoked 612 (e.g., via the dispatch engine) and provided a notification to inform the registered action handler that a new intent other than its primary intent is about to added to the stack on top of the stack item associated with the registered action handler (i.e., the stack item storing its primary intent).

In some examples, in response to reception of the notification, the registered action handler determines 614 whether to process the new intent. In many cases, the registered action handler processes the notification as purely informational and takes no action other than, for example, acknowledgement. However, in some examples, the registered action handler handles/processes the new intent itself. Actions executed by the registered action handler in this subprocess are described further below with reference to FIG. 6B. Optionally, where the registered action handler determines to not process the new intent itself, the registered action handler can evict 622 itself from the stack by, for example, removing its associated stack item from the stack. If the registered action handler does not support the new intent then the stack engine pushes 620 a new item on to the stack database that contains that the new intent (and, in at least some examples, no parameters) and then invokes 618 (e.g., via the dispatch engine) the action handler for the new intent.

The action handler invoked by the dispatch engine in acts 612, 616, or 618 processes the received intent. This process can include execution any programmatic actions requested by the user (e.g., open a document, schedule a meeting, order a coffee, etc.), generation of a user response (e.g., in the form of a text string to be rendered visually or auditorily), and/or generation of instructions to manipulate the stack (e.g., add or remove items). The action handler returns a response message to the dispatch engine that includes the user response and/or the instructions. In other words, when an action handler is invoked, it can return to the dispatch engine a response that indicates what stack manipulation to perform and what user response to give to the user. Via the instructions, the handler can instruct the dispatch engine to add new intent(s) and parameter(s) to the stack data set (e.g., either immediately below or above its associated item).

For example, the ScheduleQuery action handler may request a new JoinAConferenceCall intent to be added to the stack after its associated item, setting the parameters to be the dial-in number and PIN code for the conference call (assuming that the ScheduleQuery action handler has found these in the user's calendar). The ScheduleQuery handler may also instruct the dispatch engine to remove itself from the stack (e.g., by removing the item associated with the ScheduleQuery action handler from the stack). Typically this will be done when the conversation stack architecture (e.g., the handler 512 or stack engine 420) determines that the intent is completely dealt with or otherwise resolved. For example, where the action handler associated with the JoinAConferenceCall intent has successfully connected the user to a conference call, the action handler associated with the JoinAConferenceCall intent may remove itself from the stack (e.g., by instructing the dispatch engine to remove the item including the JoinAConferenceCall intent from the stack).

In other instances, to completely deal with or otherwise resolve an intent the handler may remain on the stack (e.g., by not instructing the dispatch engine to remove its associated item from the stack). For instance, when the handler asks a follow-up question, such as our JoinAConferenceCall, the handler may ask "do you want to join the call" then await a "Yes" or a "No" intent. In such cases, the handler can remain on the stack (e.g., via its associated item) until the follow-up question is resolved based on a received intent (e.g., a generic Yes or No intent). Handlers can also be configured to terminate the conversation.

In some examples, the dispatch engine receives and processes the response message from the invoked action handler. Where the response message includes instructions to manipulate the stack, the dispatch engine manipulates 624 the stack according to the instructions. The dispatch engine determines 626 whether the item at the top of the stack changed. If, after this manipulation, the item at the top of the stack has changed, the dispatch engine calls 628 the action handler of the intent that is now at the top of the stack to request an additional response to provide to the user. This can be referred to herein as a "peek." A peek doesn't lead to any stack manipulation but gives the handler that will be likely be called next the opportunity to prompt the user for input that it will need to handle its intent. Any user response generated by the peek is appended 630 to the original handler's user response. One reason for this peek is to allow arbitrary composition of intents on the stack where each intent's handler only needs to worry about its own responses and questions, but the user expects to experience a flowing conversation where the end of one intent flows into the start of the next.

For example, our ScheduleQuery handler may have returned a response, "You have a Staff Meeting in 3 minutes.", and the "peek" to the JoinAConferenceCall handler which follows it in the stack returns "Would you like me to dial you into the conference call?" These two responses are concatenated and replied to the user as a single response. The user may then answer with a "Yes" intent which will be handled by the JoinAConferenceCall intent which will then immediately be able to perform the requested action.

The dispatch engine determines 632 whether the stack is empty. When the stack is empty, the fulfillment response (e.g., provided by the conversation stack architecture to the conversation agent) indicates 634 that the conversation with the user should be terminated. The conversation stack architecture sends 636 the response to the user (e.g., by transmitting a fulfillment response to the conversation agent).

Returning to FIG. 6C, when the conversation stack architecture receives a generic user reply intent, (e.g. "Yes" or "No") the action handler for the intent in the item at the top of the stack is checked 638 to see if it can handle that generic intent. If it can, the handler is invoked 642 with the generic intent and the dispatch engine proceeds to manipulate 624 the stack based on a response message from the invoked handler. If the handler can't process the generic intent, then an error condition is created which leads to the user being told 640 that the virtual assistant (e.g., virtual assistant device 404) doesn't know how to handle the request/reply that the user gave.

Processes in accordance with the process 600 implement an execution framework for a conversation agents that promotes development loosely coupled agents that operate on local information. Such agents are better positioned to take part in a naturally flowing conversation with users.

Figure 7:
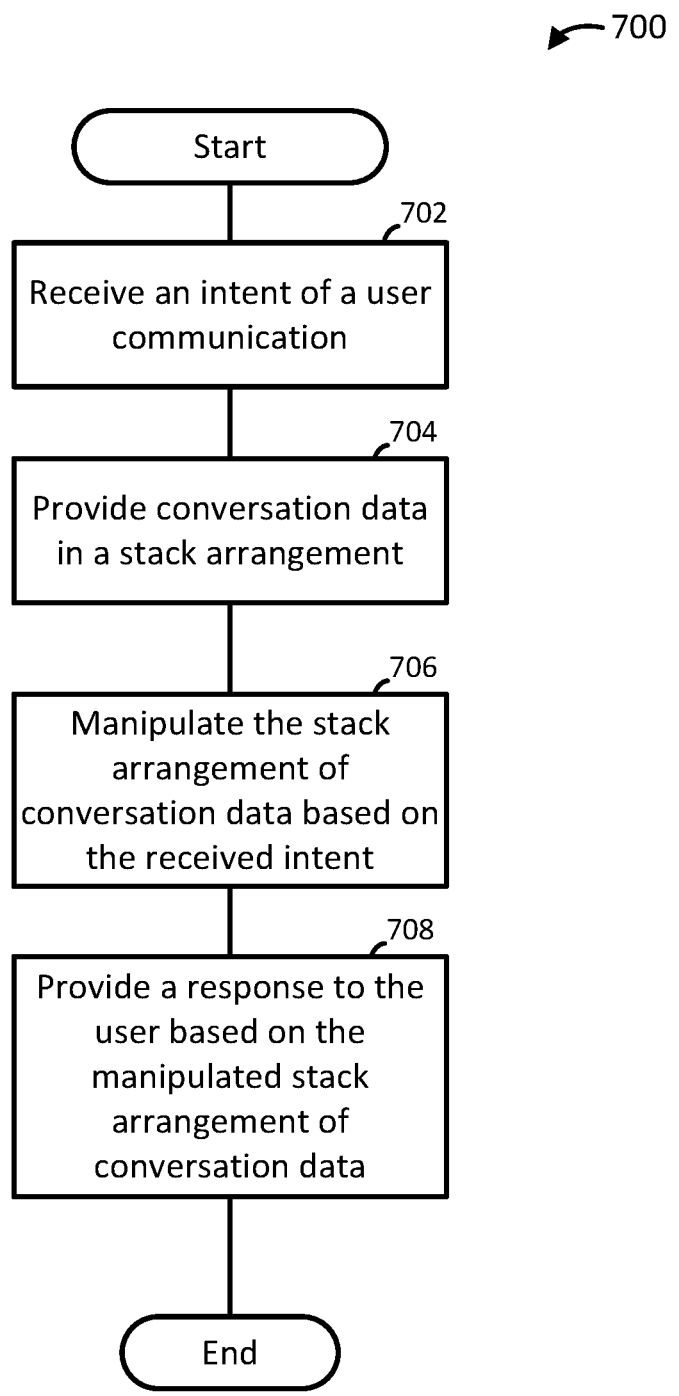
FIG. 7 is a flowchart of another method for providing responses to a user of a virtual assistant implemented by a distributed computer system including a conversation stack architecture in accordance with one or more examples described herein.

FIG. 7 is a flowchart of another example method/process 700 for providing responses to a user of a virtual assistant based on a conversation stack architecture (e.g., the conversation stack architecture illustrated in FIGS. 4 and 5).

As shown in FIG. 7, the process 700 starts with the conversation stack architecture receiving 702 an intent of a user communication. For instance, the conversation stack architecture can receive a fulfillment request from a conversation agent, such as a skill.

The conversation stack architecture provides 704 conversation data in a stack arrangement. For instance, the conversation stack architecture (e.g., one or more of the adapters 416 of FIG. 4) can parse the fulfillment request and use information contained in the fulfillment request to identify and/or construct a stack data structure including items with fields storing identifiers of intents and parameters associated therewith. As described above, the processes used by the conversation stack architecture can vary based on the conventions and operation of the conversation agent and its supporting infrastructure.

The conversation stack architecture manipulates 706 the stack arrangement of conversation data based on the received intent. For instance, the conversation stack architecture (e.g., the stack engine 420 of FIG. 4) can identify the received intent and a current version of the stack and dispatch the received intent for handling by a registered action handler (e.g., one of the action handlers 512 of FIG. 5). The registered action handler can process the intent and return a response message to the dispatch engine that specifies a user response and instructions for stack manipulation. Such stack manipulation can include adding and/or removing items from the stack. The dispatch engine can, in turn, manipulate the stack according to the instructions. Where the top stack item changes as a result of the manipulation, the dispatch engine can provide a peek to the action handler associated with the stack item at the top stack item and append a user response generated by the peek to the user response returned by the registered action handler.

The conversation stack architecture provides 708 a response to the user based on the manipulated stack arrangement of conversation data. For instance, the dispatch engine can transmit a user response generated by either an action handler or itself to an adapter (e.g., an adapter 416 of FIG. 4) that can, in turn, transmit a fulfillment response including the user response to the conversation agent interoperating with a virtual assistant.

Processes in accordance with the process 700 enable a conversation stack architecture to support conversation agents capable of participating in user interactions in which the user utter multiple intents within a naturally layered conversation.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Example Conversation

The operation of the conversation stack architecture and the processes it executes will now be described with reference to a sequence of tables that include representations a conversation stack at various points within the conversation. In other words, the following tables provide an example that represents a conversation between a user and a virtual assistant using the conversation stack architecture of the present disclosure. TABLE-1 represents a stack at the beginning of a conversation between a user and a virtual assistant. As can be seen, the stack (or otherwise known as the data set) is initially empty. Upon beginning the conversation, a new item is entered (pushed) into the data set having an associated intent (e.g., "DefaultWelcomeIntent"). In response, the architecture generates or otherwise provides instructions (e.g., "DefaultWelcomeIntent", "remove self", "Push AnythingElse" and "Respond: Hello, how can I help?". Each of these instructions can be performed in turn to begin a conversation flow with the user via the virtual assistant devices.

TABLE 1

| (conversion begins) |  |
|---|---|
| User: "Virtual Assistant (VA), Open Citrix" ("DefaultWelcomeIntent" intent) |  |
| Stack before |  |
| Intent | Params |
| Stack during |  |
| Intent | Params |
| DefaultWelcomeIntent |  |
| Handler instructions |  |
| (DefaultWelcomeIntent handler) |  |
| Remove self |  |
| Push AnythingElse |  |
| Respond: "Hello, how can I help?" |  |
| Stack after |  |
| Intent | Params |
| Anything Else |  |

TABLE-2 represents a subsequent part of the conversation flow between the user and the virtual assistant devices. As can be seen, the stack (or stack data set) includes the intent from the previous table. During the manipulation of the stack, another intent ("ScheduleQuery") has been added above the previous intent ("AnythingElse") and new instructions are generated for use by the architecture based on the added item of data (or intent) in the data structure. As can be seen, upon execution of the handler instructions related to the "Schedule Query" that intent is removed from the data structure (otherwise referred to as the stack) and two other intents "GetStuffDone" and "JoinAConferenceCall" are pushed onto the stack. Note that the context of the conversation flow is maintained by the position of the items of data (or intents) within the data structure (or stack) as demonstrated by the intent "AnythingElse" remaining at the bottom of the stack.

TABLE 2

VA: "Hello, how can I help?"
User: "What's on my schedule" ("ScheduleQuery" intent)
Stack before

| Intent | Params |
|---|---|
| AnythingElse | |

Stack during

| Intent | Params |
|---|---|
| ScheduleQuery | |
| AnythingElse | |

Handler instructions
(ScheduleQuery handler)
Remove self
Push JoinAConferenceCall
Push GetStuffDone
Respond: "Hello, how can I help?"
Stack after

| Intent | Params |
|---|---|
| GetStuffDone | |
| JoinAConferenceCall | |
| AnythingElse | |

TABLE-3 illustrates a response to the initial user request shown in TABLE-2. In addition, the architecture of the present disclosure can provide additional tasks or services based on the previously received intent of the user. In this example, based on the intent "GetStuffDone" the architecture also asks the user if the user would like to perform tasks while waiting for the meeting to begin. Based on the user's response, the intent "GetStuffDone" is removed from the stack and replaced with a new intent "ApproveItem" at the top of the stack.

TABLE 3

VA: "You have a Staff Meeting in 3 minutes. Would you like to use the time to get some tasks done?"
(Note the second part of the response came from "peek" to GetStuffDone)
User: "Yes" ("Yes" intent)
Stack before

| Intent | Params |
|---|---|
| GetStuffDone | taskid = 27646 |
| JoinAConferenceCall | |
| AnythingElse | |

Stack during

| Intent | Params |
|---|---|
| GetStuffDone | |
| JoinAConferenceCall | |
| AnythingElse | |

Handler instructions
(GetStuffDone handler)
Remove self
Push ApproveItem(tasked = 27646)
Respond: "OK."
Stack after

| Intent | Params |
|---|---|
| ApproveItem | taskid = 27646 |
| JoinAConferenceCall | |
| AnythingElse | |

TABLE-4 represents a next portion of the conversation in which instructions are generated by the architecture for the topmost item, "ApproveItem", of the data structure (or stack). Note that in this case, the execution of the instructions causes a side effect or other action response. In this example, the architecture provides information or data (e.g., an update/message) to a service or device to modify information used by the service or device. The services and devices can be either internal or external to the architecture framework described herein. Upon execution of these instructions, the intent "ApproveItem" is removed from the stack. As can be seen, no new item is placed onto the data structure so next item in the data stack flow, "JoinAConferenceCall", is positioned at the top of the stack.

TABLE 4

VA: "OK. 1 have one high priority task for you. John Doe has requested approval to travel to Synergy. Do you approve?"
(Note the second part of the response came from "peek" to ApproveItem)
User: "No" ("No" intent)
Stack before

| Intent | Params |
|---|---|
| ApproveItem | taskid = 27646 |
| JoinAConferenceCall | |
| AnythingElse | |

Stack during

| Intent | Params |
|---|---|
| ApproveItem | Tasked = 27646 |
| JoinAConferenceCall | |
| AnythingElse | |

Handler instructions
(ApproveItem handler)
Remove self
Respond: "Request denied"
Side effect: update Sapho
Stack after

| Intent | Params |
|---|---|
| JoinAConferenceCall | |
| AnythingElse | |

TABLE-5 illustrates another portion of the conversation in which the architecture executes the next portion of the stack, "JoinAConferenceCall", after the item (or intent) of "ApproveItem" has been cleared or otherwise removed from the stack.

TABLE 5

VA: "Request denied. Would you like me to dial you in to your conference call?"
(Note the second part of the response came from "peek" to JoinAConferenceCall)
User: "Yes" ("Yes" intent)
Stack before

| Intent | Params |
|---|---|
| JoinAConferenceCall | |
| AnythingElse | |

Stack during

| Intent | Params |
|---|---|
| JoinAConferenceCall | |
| AnythingElse | |

Handler instructions
(JoinAConferenceCall handler)
Remove self
Respond: "OK, dialing your phone"
Side effect: dials phone into call and injects PIN
Stack after

| Intent | Params |
|---|---|
| AnythingElse | |

TABLE-6 represents a portion of the conversation in which the architecture executes a final portion of the stack (also referred to as the stack data set) and terminates the conversation.

TABLE 6

VA: "OK, dialing your phone. Is there anything else I can do for you?"
(Note the second part of the response came from "peek" to AnythingElse)
User: "No thanks" ("No" intent)
Stack before
Intent                                              Params
AnythingElse
Stack during
Intent                                              Params
AnythingElse
Handler instructions
(AnythingElse handler)
Remove self
Respond: "OK, give me a shout if you need
anything later"
Stack after
Intent                                              Params
VA: "OK, give me a shout if you need anything later"
(conversation ends)

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A computer system for supporting a conversation between a user and a virtual assistant, the computer system comprising:
a memory; and
at least one processor coupled to the memory to:
receive, from the virtual assistant, a fulfillment request specifying an intent requesting information and/or execution of an action;
push an item onto a conversation stack stored in the memory, wherein the item includes an identifier of the intent;
in response to determining that the received intent is not a generic user reply intent, determine that the intent matches an intent of a registered action handler;
receive, from the registered action handler, one or more instructions to manipulate the conversation stack, wherein the one or more instructions include an instruction to remove the item from the conversation stack;
manipulate the conversation stack in accordance with the one or more instructions; and
store the conversation stack in the memory for subsequent processing within the conversation.

2. The computer system of claim 1, wherein the intent is a first intent, the item is a first item, and to manipulate the conversation stack comprises to push a second item onto the conversation stack, the second item including an identifier of a second intent, and the at least one processor is further configured to:
peek at the second item in the conversation stack to generate a response to the user regarding the second intent; and
transmit a fulfillment response to the virtual assistant, the fulfillment response comprising the response to the user.

3. The computer system of claim 2, wherein the registered action handler is a first action handler and to peek comprises to execute a second action handler associated with the second item.

4. The computer system of claim 1, wherein the fulfillment request comprises a full representation of the conversation stack.

5. The computer system of claim 1, wherein the fulfillment request comprises a session identifier, and the at least one processor is further configured to store, in the memory, an association between the conversation stack and the session identifier.

6. The computer system of claim 1, wherein the intent is a first intent, the fulfillment request is a first fulfillment request, and the at least one processor is further configured to:
receive a second fulfillment request comprising a second intent;
call the registered action handler with the second intent to determine whether the registered action handler can process the second intent; and
process a response message from the registered action handler.

7. The computer system of claim 6, wherein the response message specifies a response to the user and at least one instruction to manipulate the conversation stack and the at least one processor is further configured to:
append the response to the user to another response to the user; and
manipulate the conversation stack in accordance with the at least one instruction.

8. The computer system of claim 6, wherein the response message specifies no additional action and the at least one processor is further configured to take no additional action regarding the response message.

9. The computer system of claim 6, wherein the item is a first item and the at least one processor is further configured to call the registered action handler to indicate that a second item will be placed atop the item prior to pushing the second item onto the conversation stack.

10. The computer system of claim 1, wherein to execute the registered action handler comprises to generate a response to the user and the at least one processor is further configured to transmit a fulfillment response to the virtual assistant, the fulfillment response comprising the response to the user.

11. The computer system of claim 1, wherein the at least one processor is further configured to execute the registered action handler, and to execute the registered action handler comprises to execute a programmatic action requested by the user.

12. The computer system of claim 1, wherein the conversation stack comprises a plurality of items, individual items of the plurality having a respective position within the conversation stack.

13. The computer system of claim 12, wherein:
to push the item onto the conversation stack comprises to push the item to occupy a topmost position within the conversation stack; and
to remove the item from the conversation stack is based on the item occupying the topmost position within the conversation stack prior to removal of the item from the conversation stack.

14. The computer system of claim 13, wherein:
the conversation stack comprises a preceding item and the item;
to push the item to occupy the topmost position comprises to push the item above the preceding item; and
to remove the topmost item from the conversation stack comprises to remove the topmost item while the preceding item remains on the conversation stack.

15. A method of supporting a conversation between a virtual assistant and a user, the method comprising:
  receiving, from the virtual assistant, a fulfillment request specifying an intent;
  pushing an item onto a conversation stack stored in a memory, wherein the item includes an identifier of the intent;
  in response to a determination that the received intent is not a generic user reply intent, determining that the intent matches an intent of a registered action handler;
  receiving, from the registered action handler, a response message including a response to the user and one or more instructions to manipulate the conversation stack, wherein the one or more instructions include an instruction to remove the item from the conversation stack;
  manipulating the conversation stack in accordance with the one or more instructions;
  storing the conversation stack in the memory for subsequent processing within the conversation; and
  transmitting a fulfillment response to the virtual assistant to continue the conversation, the fulfillment response comprising the response to the user.

16. The method of claim 15, wherein the intent is a first intent, the item is a first item, and manipulating the conversation stack comprises pushing a second item onto the conversation stack, the second item including an identifier of a second intent and the method further comprises:
  peeking at the second item in the conversation stack to generate an additional response to the user regarding the second intent; and
  appending the additional response to the user to the response to the user.

17. The method of claim 16, wherein the registered action handler is a first action handler and peeking comprises executing a second action handler associated with the second item.

18. The method of claim 15, wherein the intent is a first intent, the fulfillment request is a first fulfillment request, and the method further comprises:
  receiving a second fulfillment request comprising a second intent;
  calling the registered action handler with the second intent to determine whether the registered action handler can process the second intent; and
  processing another response message from the registered action handler.

19. The method of claim 18, wherein the item is a first item and the method further comprises calling the registered action handler to indicate that a second item will be placed atop the first item prior to pushing the second item onto the conversation stack.

20. A non-transitory computer readable medium storing executable sequences of instructions to implement a conversation stack in a memory, the conversation stack snorting a conversation between a user and a virtual assistant, the sequences of instructions comprising instructions to:
  receive, from the virtual assistant, a fulfillment request specifying an intent;
  push an item onto the conversation stack stored in the memory, wherein the item includes an identifier of the intent;
  in response to a determination that the received intent is not a generic user reply intent, determine that the intent matches an intent of a registered action handler;
  receive, from the registered action handler, one or more instructions to manipulate the conversation stack, wherein the one or more instructions include an instruction to remove the item from the conversation stack;
  manipulate the conversation stack in accordance with the one or more instructions;
  store the conversation stack in the memory for subsequent processing within the conversation; and
  transmit a fulfillment response to the virtual assistant.

21. The computer readable medium of claim 20, wherein the intent is a first intent, the item is a first item, and to manipulate the conversation stack comprises to push a second item onto the conversation stack, the second item including an identifier of a second intent, and the sequences of instructions further include instructions to:
  peek at the second item in the conversation stack to generate a response to the user regarding the second intent; and
  store the response to the user in the fulfillment response.

22. The computer readable medium of claim 21, wherein the registered action handler is a first action handler and to peek comprises to execute a second action handler associated with the second item.

23. A system comprising:
  at least one virtual assistant device; and
  a computing device in communication with the at least one virtual assistant device via a network, the computing device including a processor and a memory accessible by the processor, and configured to
  receive information about an intent of a user for a communication received at the at least one virtual assistant device, the intent being identifiable based on a set of skills of the at least one virtual assistant device;
  provide at least one item of data in a data structure of the memory, the at least one item of data representative of one context of a plurality of contexts for a given conversation between a user and the at least one virtual assistant device, and the data structure being constructed and arranged as a stack of items of data;
  modify the data structure based on the received information, the modification of the data structure including at least one of a change in a number or position of items in the stack of items of data based on the intent of the user; and
  provide a response to the user using the modified data structure, the response directed to one context of the plurality of contexts of the conversation based on one item of the data structure to prevent transmission of the response with an incorrect context.

* * * * *

UNITED STATES PATENT AND TRADEMARK OFFICE
CERTIFICATE OF CORRECTION

PATENT NO. : 11,385,910 B2
APPLICATION NO. : 16/407571
DATED : July 12, 2022
INVENTOR(S) : James R. Bulpin It is certified that error appears in the above-identified patent and that said Letters Patent is hereby corrected as shown below:

In the Claims

Column 25, Line 54, delete "versation stack in a memory, the conversation stack snorting" and insert --versation stack in a memory, the conversation stack supporting--

Signed and Sealed this
First Day of November, 2022

Katherine Kelly Vidal
Director of the United States Patent and Trademark Office